April 27, 1965  W. H. WADLINGTON  3,180,134
LEAK DETECTOR FOR OIL WELL PUMP
Filed June 4, 1962  2 Sheets-Sheet 1

W. H. WADLINGTON
*INVENTOR.*

BY

*ATTORNEY.*

April 27, 1965

W. H. WADLINGTON 3,180,134

LEAK DETECTOR FOR OIL WELL PUMP

Filed June 4, 1962

W. H. WADLINGTON
INVENTOR.

BY *W.D.Miller*

ATTORNEY.

3,180,134
LEAK DETECTOR FOR OIL WELL PUMP
William H. Wadlington, Levelland, Tex., assignor to Pan American Petroleum Corporation, Tulsa, Okla., a corporation of Delaware
Filed June 4, 1962, Ser. No. 199,926
4 Claims. (Cl. 73—40.5)

This invention concerns a method and apparatus for detecting a leak in the polished rod stuffing box on an oil well pump. More precisely, the invention relates to a method and apparatus for circulating a lubricant under pressure to the stuffing box and detecting a decrease in the pressure of the lubricant as an indication of a leak in the stuffing box seal.

Control systems have been developed in recent years for operating oil production equipment for the purpose of requiring less attention by the operating personnel. Oil well pumping units can be started and stopped without the pumper going to the well locations. This can be accomplished either by remote control or by time-cycle operating devices. One problem requiring the attention of the pumper has not been overcome by these control systems. That problem is the leaking of oil at the stuffing box on the polished rod. It has been necessary for the pumper to make periodic visits to each pumping unit to see whether a leak has developed. When a leak is found, the cap on the stuffing box must be tightened. It is sometimes customary to tighten the packing gland on the stuffing box when the pumper inspects the unit to decrease the possibility that a leak will develop before the next routine inspection. While this practice makes it possible to extend the time between visits to the units, it has the disadvantage that the life of the packing gland is shortened owing to the decreased lubrication of the polished rod at the tighter gland pressure.

The stuffing boxes on oil well pumps are designed for lubrication by the produced oil. Sometimes the production of oil stops owing to the well pumping off or the pump becoming gas locked. The packing in the stuffing box usually is damaged during such periods of inadequate lubrication. Unless the stuffing box is adjusted prior to the next pumping period, oil is likely to leak around the polished rod. This not only results in a loss of oil but it also damages growing crops and plants nearby and might pollute streams. This problem can be relieved to some extent by installing a lubricant reservoir on the stuffing box. The reservoir provides lubrication for the polished rod during periods when the pump is operating but oil is not being produced. Although this system overcomes some of the difficulties, it does not eliminate the need for the routine check of the pump units by the pumper to refill the oil reservoirs and to tighten the packing gland in the stuffing box when oil starts leaking through the seal before there has been a significant loss of oil.

My invention provides a solution to this problem by supplying a lubricant to the stuffing box continuously while the pump is operating and further by detecting the leakage of oil past the packing gland in the stuffing box. Also, the life of the packing gland will be extended because it will not be necessary to tighten it routinely on unattended pumping units equipped with this means to detect leaks.

According to my invention, the polished rod passes through a stuffing box having two packing glands. A lubricant is circulated through the stuffing box between the two glands at a pressure greater than that of the pumped oil so that any leakage will be from the lubricant chamber either past the lower gland into the pumped oil or past the upper gland to the atmosphere. The development of a leak at either of the glands is detected by an instrument which monitors the pressure of the lubricant in the stuffing box. When a leak is detected, the instrument signals the event and may shut down the pump until the necessary repairs to the stuffing box have been made.

My invention is illustrated in the attached drawings.

Figure 1:
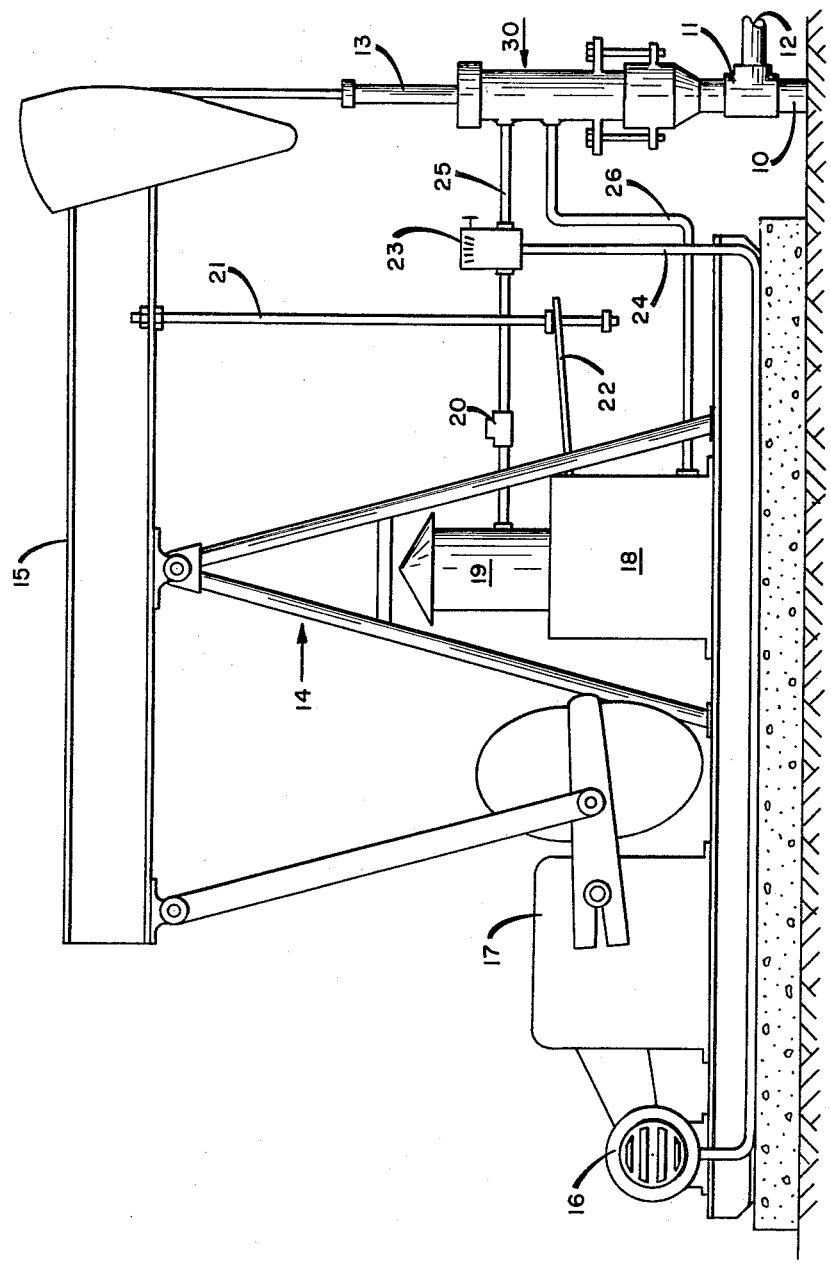
FIGURE 1 is a view showing a pumping well equipped with the apparatus of my invention.

Referring to FIGURE 1 for a description of the installation, pump jack 14, driven by electric motor 16 through gear box 17 is positioned to pump oil or other fluids from a well through tubing 10, flow T 11 and into flowline 12, which delivers the fluids to a separator or other surface facilities not shown. Lubricator 18 circulates a lubricant to stuffing box 30 on polished rod 13 above flow T 11. The lubricant flows from the lubricator to the stuffing box through line 26 and flows from the stuffing box through line 25 into lubricant reservoir 19. Back pressure valve 20 in return line 25 is adjustable so that the pressure of the lubricant in the stuffing box can be maintained at a suitable level. Pressure sensitive switch 23 in line 25 between the stuffing box and the back pressure valve is adjusted to interrupt the power to motor 16 when the pressure in line 25 drops below a preset value.

Lubricator 18 is a low-volume, high-pressure, positive displacement type pump. The pump is operated by arm 22 through a ratchet mechanism as the arm is moved up and down by connecting rod 21, attached to walking beam 15. The lubricator is preferably the type used in supplying small quantities of oil to machinery. These units can be set to deliver as little as a few drops of oil per minute at high pressure. Also, they can be driven either by the pump jack as shown in FIGURE 1 or through an auxiliary coupling with the prime mover.

Figure 2:
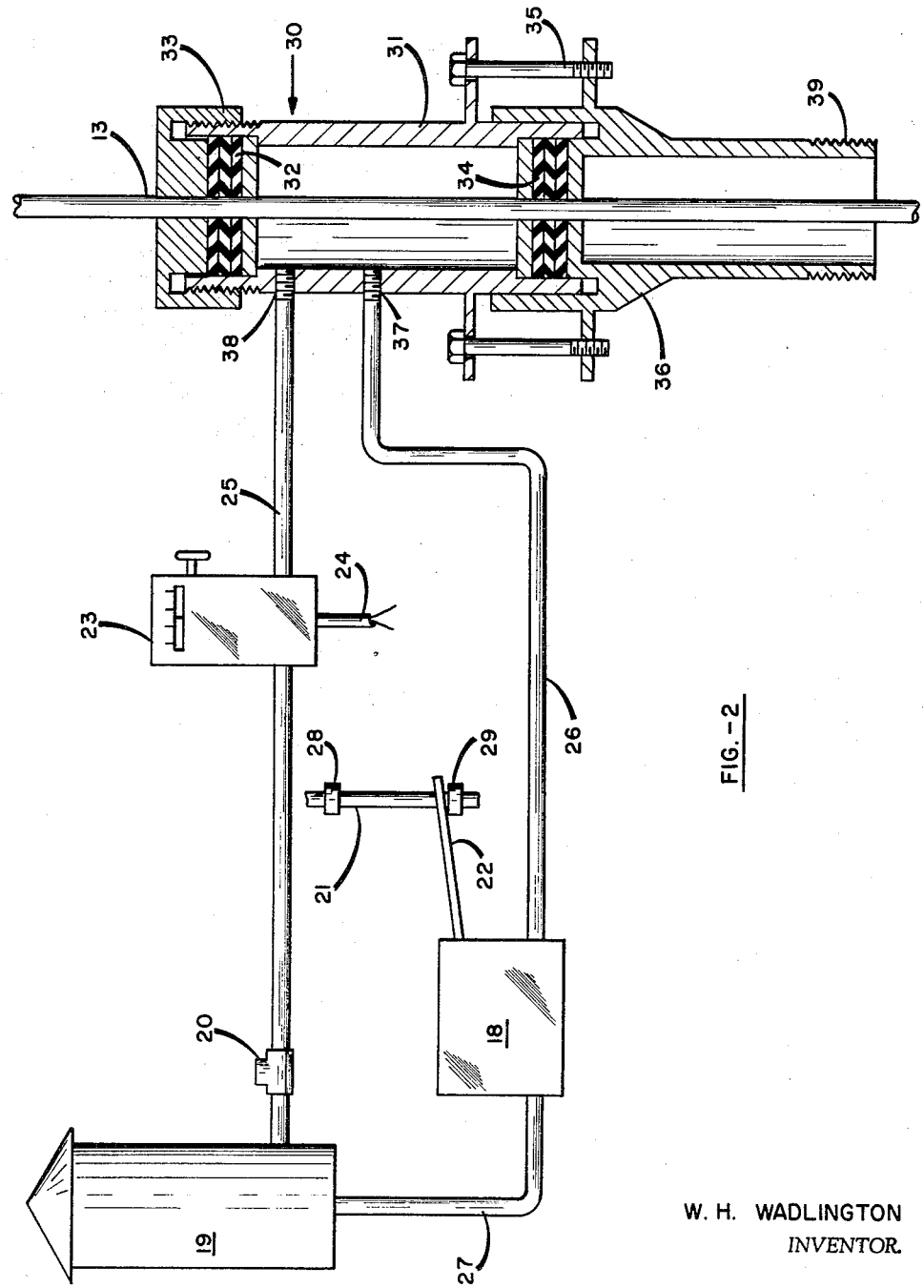
FIGURE 2 is a view, partly in cross-section, illustrating the stuffing box and lubricant circulating system.

A more detailed illustration of the stuffing box and lubricant circulating system is presented in FIGURE 2. Stuffing box 30 comprises cylindrical body 31 with upper packing gland 32 retained by threaded cap 33 and lower packing gland 34 retained by cap 36 secured to body 31 by bolts 35. Tubing joint 39 on the lower end of bolted cap 36 provides a means for connecting the stuffing box to a fluid conduit such as flow T 11. Packing glands 32 and 34 may embody a ring type composition packing material similar to that presently used in many polished rod stuffing boxes. The seal at upper gland 32 can be adjusted by tightening cap 33 and lower gland 34 is adjusted with bolts 35.

Lubricator 18 pumps lubricant at a constant rate from reservoir 19 and suction line 27 through discharge line 26 to stuffing box inlet 37. The lubricant circulates through stuffing box body 31 and discharges through return line 25 at stuffing box outlet 38. Back pressure valve 20 throttles the flow of lubricant into reservoir 19 to maintain a pressure in the stuffing box greater than that at the well pump outlet at tubing joint 39 below lower gland 34. A small amount of lubricant will be consumed in lubricating the polished rod. In most instances, a small amount of oil leakage can be tolerated. Lubricator 18 should be set to deliver a volume equal to the sum of that required for polished rod lubrication and the permissible leakage. So long as leakage is less than the permissible rate, back pressure valve 20 will throttle and return lubricant to reservoir 19. Under conditions of excess leakage, the back pressure valve will be closed and the pressure in the stuffing box will decline. The volumetric output of the positive displacement pump in lubricator 18 can be adjusted by changing the distance between clamps 28 and 29 on connecting rod 21. Pump arm 22 is moved up and down by engagement with clamps 28 and 29, thereby operating the lubricator pump.

Low pressure switch 23 in line 25 has a fluid-pressure responsive element which actuates a switch in an electrical circuit. The pressure responsive element may be any of the common devices such as a Bourdon tubes, bellows and the like. The electrical switch may be either the mercury type or a relay in a low voltage control system. It is particularly desirable that switch 23 have means to adjust the pressure at which the electrical switch is operated.

In the operation of this apparatus, pressure actuated switch 23 is set for operation at the desired pressure level. Back pressure valve 20 is adjusted to maintain fluid pressure in body 31 of the stuffing box slightly greater than that in flowline 12 so that a leak at packing gland 34 will result in a loss of lubricant from the stuffing box into the flowline. Connecting rod clamps 28 and 29 are adjusted so that the pump in lubricator 18 delivers lubricant to the stuffing box at a rate approximately equal to the permissible leakage rate through the packing glands. Thus, under normal pumping conditions valve 20 will open to allow the lubricant to circulate through the stuffing box and return to reservoir 19. As either of the packing glands becomes worn, some of the lubricant leaks away and valve 20 throttles the flow to maintain the preset pressure in the system. With further wear on the gland, the leakage rate increases until valve 20 is completely closed and eventually the pressure in the lubrication system declines to the level where switch 23 is actuated. FIGURE 1 shows the switch tied in with the electric motor which operates the pump jack. In this arrangement, the motor can be shut down to stop the loss of lubricant until the defective gland is repaired. Pumps operated by an internal combustion engine might be shut down by connecting switch 23 so that it grounds the engine ignition system when there is a drop in fluid pressure. In some instances it may be desirable to transmit a signal to a control center when a pump shuts down in this manner so that the necessary repairs can be made and the well placed back on production as soon as possible.

A time delay switch can be used in combination with low pressure switch 23 to prevent a pump shut-down during a momentary surge in lubricant pressure and to aid in starting the pump after shut-down periods when the pressure in the lubrication system has declined.

I have described my invention with specific reference to its use on an oil well pump for the reason that it is particularly appropriate to the problem in lease automation. It can be employed to advantage in many other installations where it is desirable to avoid excessive fluid loss at the seal on a rotating or reciprocating shaft. For example, the chemical process industries frequently handle solutions of dangerous materials. This method of detaching leaks can be used either to shut down a defective unit or to signal the presence of a leak before there has been a substantial loss of the dangerous material.

From the foregoing description of my invention, embodiments other than those specifically described will be apparent to those skilled in the art. Therefore, my invention should be construed according to the following claims rather than the specific examples described.

I claim:
1. An apparatus to detect a leak at the packing gland on a polished rod comprising:
a packing gland body having an axial passage therethrough,
a separately adjustable packing gland at each end of said body adapted to produce a fluid seal between said body and a polished rod passing through said axial passage,
means to connect one end of said body to a fluid-containing conduit having a polished rod extending therefrom,
a fluid inlet and a fluid outlet in said body between said packing glands,
means to pump fluid into said body at a constant rate which is approximately the permissible leakage rate,
a back-pressure control valve in said fluid outlet adjusted to hold a pressure greater than that of the fluid is said conduit, and
means to detect and respond to low fluid pressure in said body.
2. An apparatus to detect a leak at the stuffing box on the polished rod of an oil well pump comprising:
a stuffing box body enclosing said polished rod, the lower end of said body having means for connection to the tubing of said oil well,
packing glands near the ends of said stuffing box body, said glands being separately adjustable and each adapted to provide a fluid seal between said body and said polished rod,
a lubricant inlet and a lubricant outlet in said stuffing box body between said packing glands,
a positive displacement pump connected to said inlet and arranged to deliver lubricant to said stuffing box body at a constant rate which is approximately equal to the permissible leakage rate,
a back-pressure valve in said lubricant outlet adapted to maintain the fluid pressure in said body above that of the discharge of said well pump,
a pressure-responsive element in fluid communication with the interior of said stuffing box body, and
an electric switch in operative connection with said pressure responsive element whereby a decrease in the fluid pressure in said body owing to a leak at the stuffing box changes the position of said switch.
3. A lubricated stuffing box for the polished rod of a reciprocating pump comprising:
a stuffing box body having an axial passage therethrough,
packing glands in said axial passage at each end of said body adapted to effect a fluid seal between said stuffing box body and a polishing rod extending therethrough,
means for separately adjusting said packing glands,
means to connect one end of said stuffing box body to the fluid outlet of said reciprocating pump with the polished rod passing through said packing glands,
a lubricant inlet and a lubricant outlet in said stuffing box body,
means to circulate a lubricant through said body at a rate which is approximately equal to the permissible leakage rate, and
valve means to maintain the pressure of said lubricant in said stuffing box body above the outlet pressure of said reciprocating pump so long as said packing glands maintain their seal between said stuffing box body and said polished rod.
4. In a method of detecting a leak at the stuffing box on the polished rod of a well pump, the steps comprising:
producing first and second fluid seals between said polished rod and the body of said stuffing box,
pumping a lubricant at a constant rate into said stuffing box between said fluid seals, which rate is approximately equal to the rate of permissible leakage, venting lubricant from said stuffing box through a back-pressure valve set to open at a pressure greater than the discharge pressure of said oil pump, producing a response to the decrease in the pressure of said lubricant in said stuffing box which occurs when said lubricant leaks from said stuffing box faster than it is supplied thereto, and utilizing said response to stop the operation of said pump.

References Cited by the Examiner

UNITED STATES PATENTS

| | | | |
|---|---|---|---|
| 719,460 | 2/03 | Goosmann | 277—3 |
| 728,124 | 5/03 | Mitchell | 277—3 |
| 2,567,479 | 9/51 | Hebard | 277—3 |
| 2,767,392 | 10/56 | Szwargulski | 340—242 |
| 2,895,751 | 7/59 | Standish | 277—3 |
| 2,915,975 | 12/59 | Kittrell et al. | 103—25 |
| 2,953,659 | 9/60 | Edwards. | |

ISSAC LISANN, *Primary Examiner.*